Aug. 2, 1960

L. BODDY 2,947,979

SIGNAL SYSTEM

Filed Sept. 23, 1955

INVENTOR.
Leonard Boddy
BY
Harness, Dickey & Pierce
ATTORNEYS.

United States Patent Office
2,947,979
Patented Aug. 2, 1960

2,947,979

SIGNAL SYSTEM

Leonard Boddy, Ann Arbor, Mich., assignor to King-Seeley Corporation, Ann Arbor, Mich., a corporation of Michigan Filed Sept. 23, 1955, Ser. No. 536,187

24 Claims. (Cl. 340—213)

This invention relates to signal systems and more particularly to an improved signal system for indicating the existence of an abnormal physical condition on a motor vehicle.

Heretofore, various electrical gauging systems have been devised to indicate the physical conditions on a motor vehicle, as for example, the fuel level, oil level, engine temperature, battery charging rate, oil pressure and the like. It has also been found desirable to provide signaling systems, as distinguished from gauging systems, which operate to attract the attention of the vehicle operator whenever a particular physical condition reaches an abnormal or critical value, as for example, low fuel level, low oil pressure, high engine temperature and the like, in order to prevent inconvenience to the operator and damage to the vehicle.

The physical conditions for which it is desirable to provide a signal to indicate a critical value may be divided into two categories: those which are always at a dangerous or critical value when the ignition switch is first turned on to start the engine, such as oil pressure and battery charging rate; and those which are not necessarily at a dangerous or critical value when the ignition switch is first turned on, such as fuel level, oil level and engine temperature.

Prior signaling systems automatically operate when the ignition switch is first turned on to indicate that the physical conditions in the first mentioned category are at a dangerous or critical value, thereby enabling the operator to ascertain that the signaling system is operating and in proper working order. However, prior signaling systems are subject to the defect that they do not necessarily operate when the ignition switch is first turned on to indicate the physical conditions in the second category with the result that the operator cannot conveniently ascertain whether the signaling system is in proper working order.

Accordingly, an object of the invention is to overcome disadvantages inherent in prior signaling systems of the indicated character and to provide an improved signaling system which operates momentarily when the ignition switch is first turned on in order to show the signaling system is in proper working order.

Another object of the invention is to provide an improved signaling system which may be combined with a gauging system.

Another object of the invention is to provide an improved signaling system that is simple in construction, economical to manufacture, durable, efficient and reliable in operation.

Another object of the invention is to provide an improved signaling system which operates in the event an operating condition reaches a critical value.

Still another object of the invention is to provide an improved signaling system which may be added to a vehicle as an accessory or which may be supplied as a part of the original equipment thereof.

The above as well as other objects and advantages of the invention will become apparent from the following description, the appended claims and the accompanying drawings wherein:

Fig. 8 is a diagrammatic view of a modified form of the arrangement of Fig. 5 demonstrating the application of the principles of the invention to a different type of gauging system.

Figure 1:
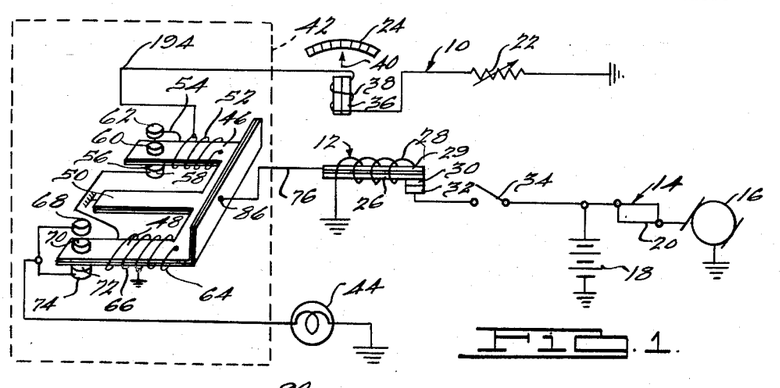
Figure 1 is a diagrammatic view of a signaling system embodying one form of the invention.

Referring to the drawings, one form of the invention, particularly adapted to be combined with a gauge circuit as a part of the original equipment thereof or as an accessory thereto, is diagrammatically shown in Fig. 1. An illustrative gauge circuit, generally designated 10, is illustrated which may be of the type disclosed in the applicant's co-pending application Serial No. 138,249, filed January 12, 1950 now Patent No. 2,762,-997. Such a gauge circuit is of the regulated voltage type, but it will be understood that the present invention is equally applicable to other types of gauge circuits. The gauge circuit receives electrical energy at a voltage regulated by a voltage regulator 12 from a source 14. The source may be of various types, but when the present invention is used in connection with automotive vehicles, source 14 may, for example, comprise the usual engine driven generator 16 and a battery 18. In line with conventional automotive practice, a voltage regulator 20 is interposed between the generator and the battery, and serves to maintain the voltage of the battery between limits which are acceptable for many vehicle requirements. However, in practice, these limits are not close enough for satisfactory operation of the desirably simple gauges in a circuit of the voltage regulated type. As more fully explained in the aforementioned co-pending application, the regulator 12 receives the variable output of the source 14 and delivers pulsating energy to the gauging circuit 10, the effective voltage of the regulator 12 being substantially independent of variations of voltage in the source. Under these conditions the gauge circuit can utilize a temperature measuring resistance element 22 having a positive temperature co-efficient of resistance, that is, an element the resistance of which increases as the temperature rises. It will, of course, be apparent to those skilled in the art that float operated rheostatic elements may be used to vary the resistance of the gauge circuit so as to control the current therethrough and consequently the positions of a gauge 24.

The regulator 12 includes a thermally responsive member 26, at least a portion of which tends to move as a consequence of changes in the temperature thereof. As diagrammatically shown in Fig. 1 the regulator comprises the thermally responsive trimetallic element 26 which carries a heater winding 28. One terminal of the heater winding is grounded as indicated and the other terminal is electrically connected to the element 26. The element 26 carries a movable contact 30 which normally engages a fixed contact 32. Contact 32 is in turn connected to the source through a control switch 34 which may, for example, be controlled concurrently with or be a part of the ignition switch of the associated vehicle.

With this relation, the closure of the switch 34 completes a circuit from source 14 through contacts 32 and 30, the body of the element 26 and the heater winding 28 to ground. Completion of this circuit supplies heat to the element 26 and causes its temperature to rise. As more fully disclosed in the applicant's aforementioned co-pending application, the electrical resistance of the element 26 is so low that for all practical purposes all of the heating effect can be considered as derived from the heater winding 28. With this relation, element 26 can also serve as a conductor of the gauging and heating currents. Upon being heated, the element 26 warps and separates the contacts 30 and 32, interrupting the just traced circuit and reducing the heating effect of the heater winding. The reduction of the heating effect enables the element 26 to cool and restore the contacts 30 and 32 to the closed position. So long, accordingly, as the switch 34 remains closed, contacts 30 and 32 are periodically opened and closed and the heating current is regulated. Consequently, the element 26 acquires a temperature just high enough to hold the contacts 30 and 32 in a condition of incipient opening and closing. For automotive work it is usually preferred to adjust the contacts 30 and 32 of the regulator 12 to provide a regulated or effective voltage of approximately five volts.

The voltage impressed across the heater winding 28 between the terminal 29 and ground is normally equal to the voltage impressed upon the parallel gauging and signaling circuits so that the gauging and signaling circuits are supplied from the source with pulsating energy at an effective voltage which is substantially independent of variations in the voltage of the source 14. Regulator 12 thus effectively serves as a regulator of the voltage impressed across the gauging and signaling circuits and currents drawn by the gauging and signaling circuits are independent of variations in voltage of the source 14.

While any of a variety of electro-responsive constructions can be employed in connection with the gauge 24, the gauge is preferably of the temperature compensated thermostatic type. Such a gauge employs a bimetallic element 36 which carries a heater winding 38 and warping of the bimetallic element actuates an indicator needle 40 in a well-known manner. It will be appreciated that the use of a thermostatic gauge is advantageous in that it inherently has more heat capacity which can be matched with the performance of the regulator so that the individual pulsations introduced by the regulator into the current supply are integrated by the gauge. The gauge is connected to ground through the resistance element 22 which has a positive temperature co-efficient of resistance but it will be understood that the gauge could also be connected to a float controlled rheostat or other device, the resistance of which may be controlled. The resistance element 22 is located in a region in which the temperature is to be measured and the changes in temperature correspondingly affect the position of the needle of the gauge 24.

So long as the switch 34 is closed, the voltage regulator 12 acts to impress across the gauging circuit pulsating electrical energy the effective root-mean-square voltage whereof is substantially independent of variations in the voltage of the source 14 as well as being substantially independent of the gauging currents which are drawn by the gauging circuit. It will be appreciated that the indicator 24 responds to variations in the resistance of the element 22 and produces a corresponding indication of the associated operating condition, such as engine temperature.

A control unit, generally designated 42, is interposed in the gauging circuit 10 and functions as a signal relay and also functions as a delay relay. The control unit 42 in turn controls a lamp 44 or other signaling device which may be located on the vehicle dashboard or in any other suitable place to attract the attention of the vehicle operator. The energizing of the lamp 44 attracts the attention of the vehicle operator to indicate that an operating condition has reached a critical value and requires attention.

The control unit 42 is illustrated as being of the thermally responsive type and comprises a substantially E-shaped bimetallic element the outer contact carrying legs 46 and 48 of which are integrally joined to a common temperature compensating leg 50. The leg 50 is mechanically secured to a reference surface, as is represented by an earth symbol, but the bimetallic element is insulated from electrical ground. The leg 46 carries a heater winding 52 connected in series with the indicator 24 and resistance element 22 to ground, and in the event the gauging circuit is of the regulated voltage type, the leg 46 may also carry an additional heater winding 54 for the purpose of compensating the indicator 24, as more fully explained in the previously mentioned co-pending application. The leg 46 is provided with normally closed contacts 56 and 58 and is also provided with normally open contacts 60 and 62 in the event the gauging circuit is of the regulated voltage type. The leg 48 carries heater windings 64 and 66 and is provided with normally open contacts 68 and 70 and normally closed contacts 72 and 74. One end of the winding 66 is connected to contact 58 while the other end of the winding 66 is connected to ground. One end of the heater winding 64 is connected to the leg 48 while the other end of the winding 64 is connected to ground. When the winding 64 is energized, it draws current of a relatively low value which is sufficient to heat the leg 48 to cause its temperature to rise, whereupon the leg 48 warps and moves the contacts 70 and 72 to a position intermediate the contacts 68 and 74. The heating value of the winding 64 alone is not great enough to cause the leg 48 to warp sufficiently to close the contacts 68 and 70. However, when both the windings 64 and 66 are energized, the element 48 warps sufficiently to cause the contacts 68 and 70 to engage while the contacts 72 and 74 are open.

The contacts 68 and 74 are electrically interconnected and both are connected to ground through the lamp 44.

As to the operation of the control unit, the components normally occupy the illustrated positions. Closure of the switch 34 enables the regulator 12 to impress the previously mentioned regulated voltage across the gauging circuit and the parallel signaling circuit and the lamp 44 is supplied with current from the source through switch 34, conductor 76, leg 48 and contacts 72 and 74, to ground so that the lamp lights immediately and is thus shown to be in operative condition. The initial closure of the switch 34 also completes a parallel circuit through the heater winding 64 but since the contacts 72 and 74 are initially closed, these contacts remain closed for a short period of time due to the thermal capacity of the control unit 42. The initial closure of the switch 34 also enables the regulator 12 to impress the regulated voltage across the gauging circuit and consequently the indicator 24 starts rising to the position corresponding to the existing value of the resistance element 22. The voltage initially impressed across the gauging circuit by the regulator 12 is the existing fluctuating voltage of the source 14 and this initially higher voltage serves to rather promptly heat up the regulator and place it in operation. In view of the thermal capacity thereof the warm-up period of the indicator substantially matches that of the regulator.

At the time of the initial closure of the switch 34 contacts 56 and 58 are also closed and these contacts remain closed a short time thereafter due to the thermal capacity of the contorl unit 42. While closed, the contacts 56 and 58 complete a circuit through the winding 66 to ground and the winding 66 starts to heat the leg 48. The thermal capacity and the rates of heat application to the leg 48, however, under these conditions, are such that unless the operating condition is in a critical condition, contacts 56 and 58 open before the winding 66 heats sufficiently to close contacts 68 and 70. Accordingly, assuming that the engine temperature is in a satisfactory condition at the time the switch 34 is closed to start the engine, the contacts 72 and 74 and the contacts 56 and 58 open before the heat from the winding 66 is able to combine with the heat from the winding 64 to cause contacts 68 and 70 to close. With such an arrangement, the lamp 44 will light momentarily upon the initial closure of the switch 34 to indicate that it is in operative condition and the lamp will then be de-energized when the contacts 72 and 74 open.

The rate at which heat is supplied by windings 64, 66 is preferably low in relation to the rate at which heat is supplied by winding 52. Consequently, the thermal lag of the leg 48 exceeds the thermal lag of the leg 46 even though the switch 34 is initially closed at a time when the engine temperature is relatively near the critical value. Under normal conditions, therefore, closure of the switch 34 serves only to cause the indicator 24 to take the appropriate position and does not cause the lamp 44 to relight after the momentary lamp-checking period. In addition to preventing the giving of transient signals immediately following the initial light of the lamp, the thermal lag interposed by the leg 48 also prevents such transient signals from occurring during operation of the vehicle. For example, if the indicator 24 is controlled by a float actuated rheostat rather than a resistance element, such as 22, a sudden stop of the vehicle in traffic might cause the contacts 56 and 58 to close due to the change in the level of the liquid in the tank. Momentary closure of the contacts 56 and 58 would complete a circuit through the winding 66 but would not cause the contacts 68 and 70 to close and complete the circuit through the lamp 44 to ground.

It will be appreciated that the delay interposed by the leg 48 may be varied between relatively wide limits. For example, to handle normal stops in traffic a delay between 20 and 50 seconds may be desirable, which interval is also employed to take care of the warm-up periods following initial closure of the switch 34. It will also be appreciated that by a proper correlation of the rate at which heat is supplied to and radiated from the leg 48 with the distance such leg is required to travel when closing contacts 68 and 70, the delay in closing the contacts 68 and 70 may be made substantially longer than the delay involved in reopening such contacts. Thus, elimination of the critical operation condition can be caused to quite promptly extinguish the warning signal.

Assuming that the temperature of the coolant in the engine becomes dangerously high, it will be appreciated that the current in the gauging circuit will fall to a correspondingly low value due to the action of the resistance element 22 so that the rate at which heat is supplied to the leg 46 will diminish. The contacts 56 and 58 will then close and such closure completes a circuit from the voltage regulator 12 through the leg 46, contacts 56 and 58 and winding 66 to ground. Completion of this circuit supplies heat to the leg 48 and after a brief delay, the combined heat from the windings 64 and 66 causes contacts 68 and 70 to close. Closure of these contacts completes a circuit from the voltage regulator 12 through conductor 76, leg 48, contacts 68 and 70, and lamp 44 to ground and the lamp lights. So long, accordingly, as contacts 56 and 58 are closed, the contacts 68 and 70 remain closed and the lamp will continue to burn until the operating condition is corrected.

Figure 2:
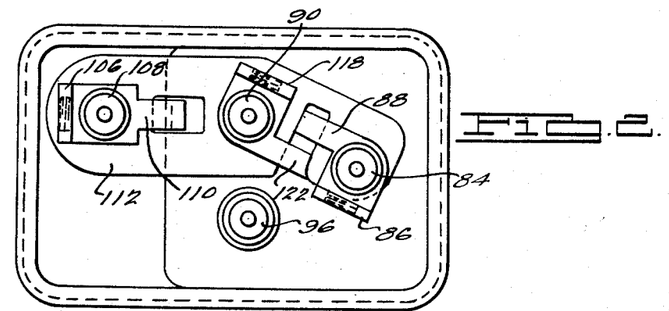
Fig. 2 is a top plan view of a combined signal and delay relay constructed in accordance with the present invention.
Figures 3, 4:
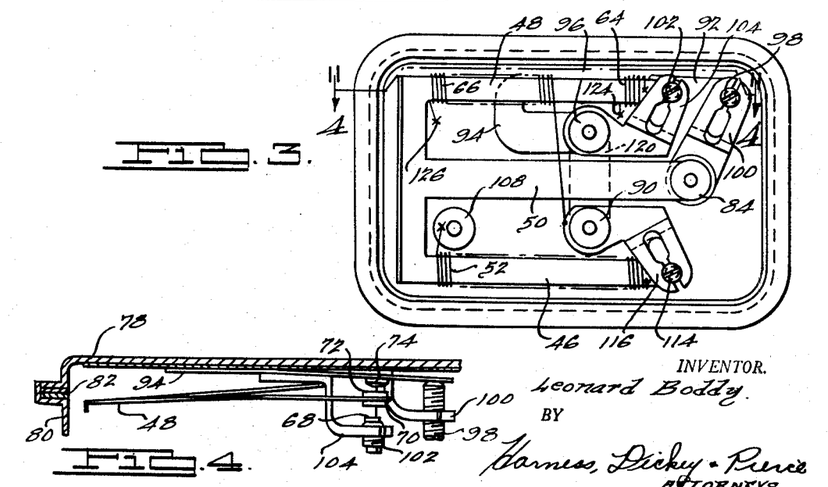
Fig. 3 is a view in bottom plan of the structure shown in Fig. 2.
Fig. 4 is a sectional view of a portion of the structure shown in Fig. 3 taken on the line 4—4 thereof.
Figure 3:
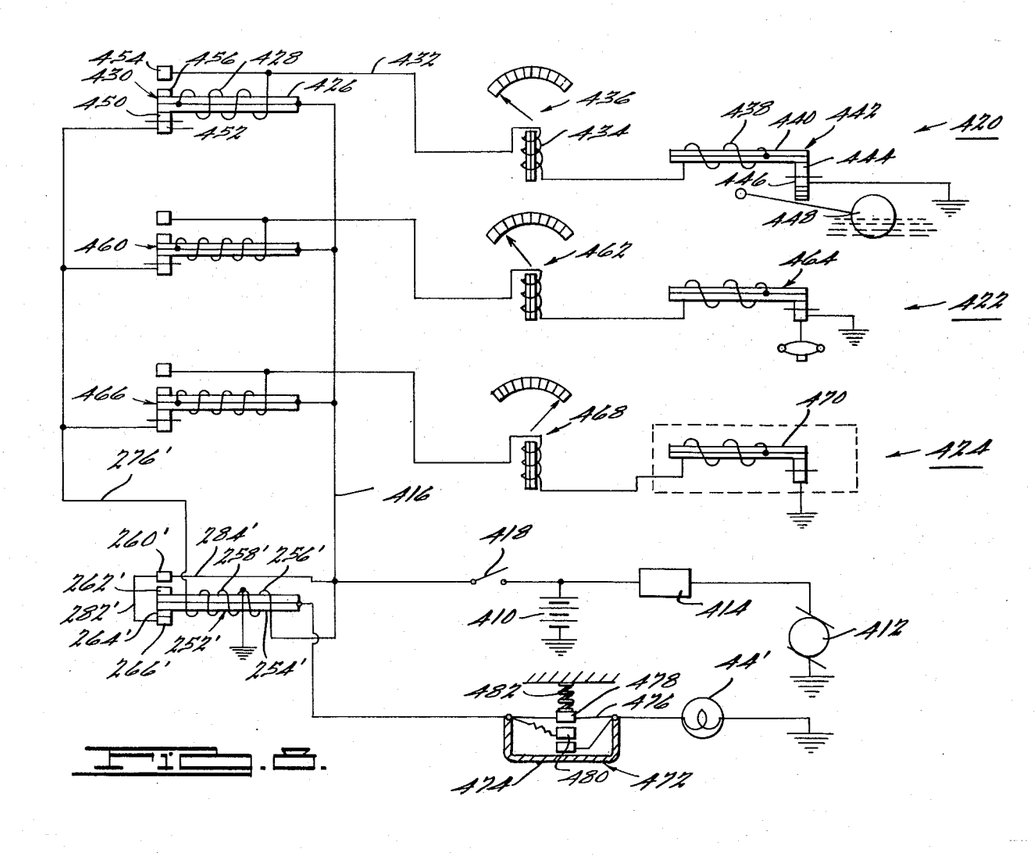

Referring to Figs. 2, 3 and 4, the elements of the control unit 42 are mounted within a sealed enclosure which includes upper and lower cup-shaped members 78 and 80 which may be formed of light-weight metal stampings or other suitable material. A sealing gasket 82 is also preferably interposed between the casing members. The bimetallic element is shown as being of E-shaped form having legs 46 and 48 which carry the previously identified heater windings and the common temperature compensating leg 50. The leg 50 is anchored at its free end to a headed rivet 84 which serves to electrically connect the leg 50 to the exposed terminal 86. It will be understood that changes in ambient temperature condition have like effects upon the three legs and cause the connecting bridge to rise and fall without altering the positions of the contacts. Current flowing in the windings, however, causes the associated leg to warp relative to the leg 50 and move the contacts.

For mounting stability the terminal 86 has a laterally extending, downwardly deflected leg 88 which is held in place by a rivet 90. Terminal 86 of Fig. 2 thus corresponds to the diagrammatically shown terminal 86 of Fig. 1.

As previously mentioned, the free end of the leg 48 carries the movable contacts 70 and 72. The fixed contact 74 is carried near one end of the free leg 92 of a U-shaped spring strip 94. The leg 92 extends parallel to and is immediately above the leg 48, as viewed in Figs. 3 and 4. The other leg of the spring strip 94 is anchored to the casing by a rivet 96. The mounting spring strip 94 for the fixed contact 74 is pre-formed so that it tends to bow downwardly, as viewed in Fig. 4, and press against the movable contact 72, thereby pre-loading the bimetallic leg 48. The free end of the leg 92 of the spring strip co-operates with an adjustable stop 98 which limits the downward movement thereof and which can be adjusted as an incident of manufacture to determine the amount of pre-loading of the bimetallic leg 48. This adjustment determines the temperature which the leg 48 must attain in order to effect a separation of the contacts 72 and 74 and consequently determines the period during which the lamp 44 will burn when the ignition switch is first closed.

The adjusting screw 98 is threadably carried by a Z-shaped mounting member 100 having a suitable threaded aperture therein and the Z-shaped member in turn is carried by the rivet 84 but is insulated therefrom as well as from the bimetallic element by suitable insulators.

The fixed contact 68 is mounted on an adjusting screw 102 which is threadably carried by a step-shaped mounting member 104 and the member 104 in turn is carried by the rivet 96; the member 104 being electrically connected to the spring strip 94 so that the fixed contact 74 is electrically connected to the fixed contact 68.

One end of the heater winding 52 is spot-welded or otherwise electrically connected to the bimetallic leg 46 and the other end of the winding 52 is connected to a terminal 106 which is secured to the casing by a rivet 108, the terminal being electrically insulated from the casing by suitable insulators. For mounting stability the terminal 106 has a laterally extending downwardly deflected leg 110 which is held in place by the plate 112.

The fixed contact 58 is mounted on an adjusting screw 114 which is threadably carried by a step-shaped mounting member 116 and the member 116 in turn is carried by the rivet 90. The rivet 90 also carries the exposed terminal 118 which is insulated from the rivet 90 and electrically connected to the mounting member 104 by a bus 120. For mounting stability, the terminal 118 is provided with a laterally extending, downwardly deflected leg 122 which is held in place by the rivet 84. In the event the gauging circuit is of the regulated voltage type, the contacts 60 and 62 may be mounted in the unit 42 in a manner similar to the mounting of the contacts 72 and 74 and the leg 46 may be provided with the winding 54.

One end of the heater winding 64 is electrically connected to the leg 48 of the bimetallic element while the other end of the winding 64 is grounded to the casing, as at 124. One end of the heater winding 66 is electrically connected to the mounting member 116 in any suitable manner while the other end of the member 66 is grounded to the casing, as at 126.

From the above description, it will be appreciated that such a construction is strong, durable and reliable in operation and may be manufactured with a minimum of labor and expense.

Figure 5:
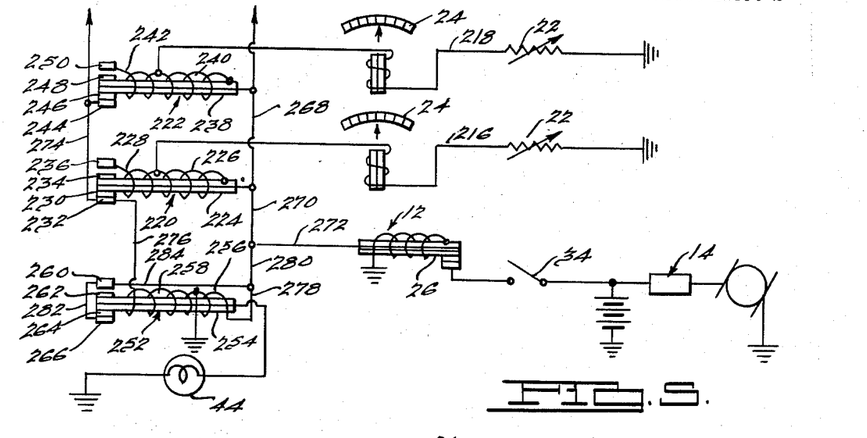
Fig. 5 is a diagrammatic view of a signaling system embodying another form of the invention.

Another embodiment of the invention is shown in Fig. 5 and is particularly adapted to be combined with a multiple gauge circuit, although it will be understood that a gauge circuit having a single gauge may be utilized. Illustrative gauge circuits 216 and 218 are shown which are connected in parallel with each other and receive electric energy at a voltage regulated by the voltage regulator 12 from the source 14. The individual gauge circuits are each provided with electrically responsive indicators 24 which are each connected to ground in series with a resistance element 22 having a positive temperature co-efficient of resistance, it being understood that the individual indicators 24 may also be connected with a float controlled rheostat or other device, the resistance of which may be controlled. Relays 220 and 222 are interposed in the gauging circuits 216 and 218, respectively. The relay 220 is comprised of a bimetallic element 224 which carries a heater winding 226, one end of which is connected in series with the associated indicator 24 and resistance element 22 to ground while the other end of the heater winding 226 is electrically connected to the bimetallic element 224. An additional heater winding 228 may also be provided for the purpose of compensating the associated indicator 24 in the event the gauge circuit is of the regulated voltage type. The bimetallic element 224 is provided with normally closed contacts 230 and 232 and is also provided with normally open contacts 234 and 236 when the gauge circuit is of the regulated voltage type. The relay 222 is constructed similarly to the relay 220 and includes a bimetallic element 238 which carries heater windings 240 and 242, one end of the winding 240 being connected to the bimetallic element 238 while the other end is connected to ground through the associated indicator 24 and resistance element 22 in the manner previously described. The bimetallic element 238 is provided with normally closed contacts 244 and 246 and normally open contacts 248 and 250 when the gauging circuit is of the regulated voltage type.

A separate light-proving relay 252 is provided which controls the signal lamp 44 or other signaling device. The relay 252 is comprised of a bimetallic element 254 which carries heater windings 256 and 258 and is provided with normally open contacts 260 and 262 and normally closed contacts 264 and 266.

The bimetallic elements 224 and 238 of the relays 220 and 222, respectively, are connected in parallel with each other by the conductor 268 and are connected in series with the element 26 of the voltage regulator 12 by the conductors 270 and 272. The contacts 232 and 244 of the relays 220 and 222, respectively, are interconnected by the conductor 274 and in series with the winding 258 of the relay 252 by the conductor 276, while the other end of the winding 258 is connected to ground. One end of the heater winding 256 is connected to ground while the other end of the winding 256 is connected to the element 26 of the voltage regulator by the conductors 278, 280 and 272. The fixed contacts 260 and 266 of the relay 252 are electrically interconnected by the conductor 282 and the contact 260 is connected to the element 26 of the voltage regulator 12 by the conductors 284, 280 and 272. The bimetallic element 254 of the relay 252 is connected to ground through the lamp 44.

When the winding 256 is energized, it draws current of a relatively low value which is sufficient to heat the element 254 and cause its temperature to rise so that the element 254 warps and separates the contacts 264 and 266. The heat supplied by the winding 256 is not sufficient to cause the element 254 to warp far enough to close the contacts 260 and 262. However, when both the windings 256 and 258 are energized, the combined heating value of both windings causes the element 254 to warp sufficiently to close the contacts 260 and 262 while the contacts 264 and 266 remain open.

In the operation of this form of the invention, the components of the relays normally occupy the positions illustrated in Fig. 5. Closure of the switch 34 enables the regulator 12 to impress the regulated voltage across the parallel gauging and signaling circuits. The lamp 44 is immediately supplied with current from the source 14 through the switch 34, regulator 12, conductors 272, 280 and 284, contact 260, conductor 282, contacts 266 and 264, and the element 254 and through the lamp to ground, and the lamp 44 lights immediately to indicate that it is in operative condition. The initial closure of the switch 34 also completes a parallel circuit through the heater winding 256 to ground but since the contacts 264 and 266 are initially closed, these last-mentioned contacts remain closed for a short period of time due to the thermal capacity of the relay 252 before the winding 256 heats the element 254 sufficiently to cause the contacts 264 and 266 to open. The initial closure of the switch 34 also enables the regulator 12 to impress the regulated voltage across the parallel gauging circuits 216 and 218 and causes the associated indicators 24 to start rising to the positions corresponding to the existing value of the associated resistance elements 22.

At the time of the initial closure of the switch 34, contacts 230 and 232 of the relay 220 and contacts 244 and 246 of the relay 222 are closed and these contacts remain closed a short time thereafter due to the thermal capacity of the respective relays. While closed, the contacts 230 and 232 and contacts 244 and 246 complete a circuit from the voltage regulator 12 through the bimetallic elements 224 and 238, conductors 274 and 276 and the winding 258 to ground and the winding 258 starts to heat the element 254 of the relay 252. The thermal capacity of the relays 220 and 222 and the rate at which heat is supplied to the bimetallic elements 224 and 238 are such that unless an operating condition is at a critical value, the contacts 230 and 232 and the contacts 244 and 246 open before the winding 258 heats the element 254 sufficiently to cause the contacts 260 and 262 to close. Such a construction permits the lamp 44 to light momentarily upon the initial closure of the switch 34 to indicate that it is in working order after which the lamp 44 is de-energized when the contacts 264 and 266 open.

The rate at which heat is supplied by the windings 256 and 258 is preferably low in relation to the rate at which heat is supplied to the windings 226 and 240 and consequently the thermal lag of the bimetallic element 254 exceeds the thermal lag of the bimetallic elements 224 and 238 even though the switch 34 is closed at a time when the operating conditions are relatively near the critical values. Thus, such a construction prevents the lamp 44 from giving transient signals immediately after the initial closure of the switch 34 and also substantially prevents the occurrence of transient signals during operation of the vehicle. The delay interposed by the element 254 may be varied between relatively wide limits in order to handle stops, starts, and turning of the vehicle and by a proper correlation of the rate at which heat is supplied to and radiated from the element 254 with the distance such element is required to travel to effect closure of the contacts 260 and 262, the delay in closing the contacts 260 and 262 may be made substantially longer than the delay involved in re-opening such contacts so that elimination of the critical operating condition causes the warning signal to extinguish promptly.

Assuming that the operating condition associated with the gauge circuit 216 reaches a critical value, the current through the winding 226 will fall to a correspondingly low value due to the effect of the associated resistance element 22 so that the rate at which heat is supplied to the bimetallic element 224 by the heater winding 226 will diminish. The contacts 230 and 232 will then close and complete a circuit from the voltage regulator through the conductors 272, 270, the bimetallic element 224, conductor 276 and heater winding 258 to ground. The completion of this circuit supplies heat to the bimetallic element 254 and after a brief delay, the combined heating effect of the windings 256 and 258 causes the contacts 260 and 262 to close. Closure of these contacts completes a circuit from the voltage regulator 12 through the conductors 272, 280, 284, bimetallic element 254 and the lamp 44 to ground, and the lamp 44 lights, thereby indicating that an operating condition has reached a critical value. The lamp 44 will then continue to burn until the operating condition is corrected.

Similarly, the closure of the contacts 244 and 246 due to the existence of a critical operating condition associated with the gauging circuit 218 completes a circuit to ground through the conductors 274, 276 and the heater winding 258 and consequently causes the lamp 44 to light in the manner previously described. Thus, it will be appreciated that any number of gauging circuits may be connected in parallel, and each of the gauging circuits may be provided with a relay, such as 220, which will complete a circuit through the winding 258 and cause the lamp 44 to light. It will also be appreciated that the lamp 44 will continue to burn so long as any one of the operating conditions remains at a critical value.

Figure 6:
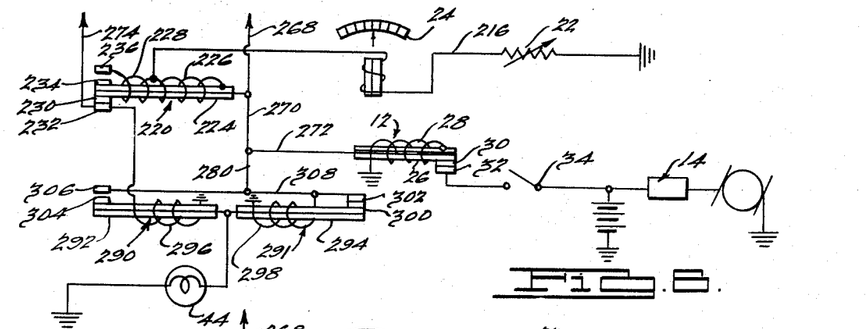
Fig. 6 is a diagrammatic view of a signaling system embodying still another form of the invention.

Another embodiment of the invention, which may be combined with a multiple gauging circuit as a part of the original equipment thereo, or added as an accessory thereto, is illustrated in Fig. 6. This embodiment of the invention includes the gauge circuits shown in Fig. 5 as well as the voltage regulator and source, and corresponding parts have been given corresponding reference numerals. In this embodiment of the invention, relays 290 and 291 are provided having bimetallic legs 292 and 294, respectively. The leg 292 carries a heater winding 296 while the leg 294 carries a heater winding 298. The leg 294 is also provided with normally closed contacts 300 and 302 while the leg 292 is provided with normally open contacts 304 and 306. One end of the winding 296 is connected to the contact 232 while the opposite end of the winding 296 is connected to ground. One end of the heater winding 298 is connected to the voltage regulator by conductors 308, 280 and 272 while the other end of the winding 298 is connected to ground. The contact 306 is connected to the conductor 280 as well as to the contact 302. The legs 292 and 294 are electrically connected to each other and to ground through the lamp 44. As to operation, closure of the switch 34 causes the actions previously described of the relay 220 and the associated indicator 24, all of which are shown in Fig. 5. In addition, closure of the ignition switch 34 completes a circuit through the lamp 44, the circuit extending through conductors 272, 280, and 308, contacts 302 and 300, leg 294 and the lamp 44 to ground, and the lamp lights immediately, thereby enabling the vehicle operator to ascertain that the lamp is in proper working order. The initial closure of the switch 34 also completes a circuit through the heater winding 298 but since the contacts 300 and 302 are initially closed, these contacts remain closed for a short period of time due to the thermal capacity of the relay 291. As previously mentioned, the initial closure of the ignition switch also enables the regulator 12 to impress the regulated voltage across the gauging circuits. The contacts 230 and 232 are initially closed and remain closed a short time thereafter due to the inherent thermal capacity of the elements. While closed, the contacts 230 and 232 complete a circuit through the winding 296 to ground and the winding 296 starts to heat the leg 292. The thermal capacities and the rate of heat application to the leg 292, however, under these conditions are such that unless the gauge circuit is in a critical condition contacts 230 and 232 open before the winding 296 heats sufficiently to close the contacts 304 and 306. Accordingly, assuming that the engine temperature is in satisfactory condition at the time the switch 34 is closed, the contacts 230 and 232 and the contacts 300 and 302 open before the heat from the winding 296 is able to cause the contacts 304 and 306 to close so that the lamp 44 will light momentarily to indicate it is in operative condition and will then be de-energized when the contacts 300 and 302 open.

The rate at which heat is supplied by winding 296 is preferably low in relation to the rate in which heat is supplied by the winding 226. Consequently, the thermal lag of the element 292 exceeds the thermal lag of the element 224 even though the switch 34 is initially closed at a time when the engine temperature is relatively near the critical value. Under normal conditions, therefore, closure of the switch 34 serves only to cause the indicator 24 to take the appropriate position and does not cause the lamp 44 to relight after the momentary lamp-checking period. In addition, the delay interposed by the element 292 also prevents transient signals from occurring in the operation of the vehicle, as previously described, and it will be appreciated that the delay interposed by the winding 296 may be varied by the relatively wide limits.

Assuming now that the temperature of the engine becomes dangerously high, it will be apparent that the current in the gauge circuit will fall to a correspondingly low value because of the effect of the positive temperature co-efficient of resistance of the element 22 and the rate at which heat is supplied to the bimetallic element 224 is considerably reduced. The contacts 230 and 232 will then close and such closure completes a circuit from the voltage regulator 12 through the leg 224, contacts 230 and 232, and the winding 296 to ground. Completion of this circuit supplies heat to the leg 292 and after a brief delay, the heat from the winding 296 causes contacts 304 and 306 to close. Closure of these contacts completes a circuit from the voltage regulator through conductors 272 and 280, contacts 306 and 304, leg 292 and the lamp 44 to ground, and the lamp will light to indicate that an operating condition has reached a critical value. So long, accordingly, as the contacts 230 and 232 are closed, the contacts 304 and 306 remain closed and the lamp continues to burn until the operating condition is corrected.

Figure 7:
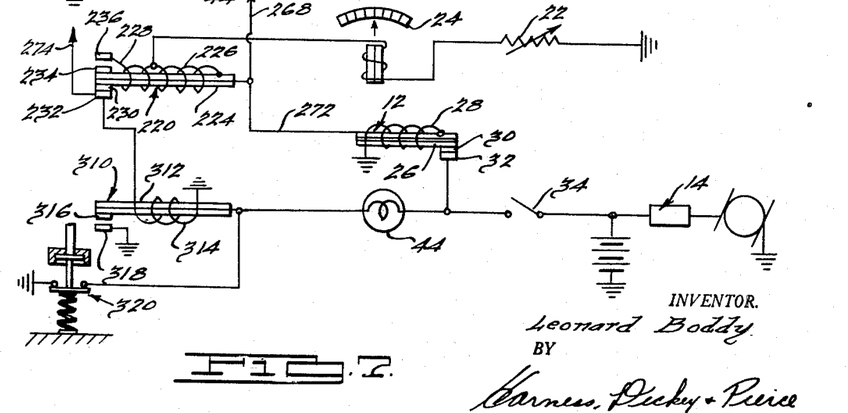
Fig. 7 is a diagrammatic view of a signaling system embodying yet another form of the invention.

The embodiment of the invention shown in Fig. 7 includes the gauging circuits previously described and the components corresponding to the previously described embodiments of the invention have been given corresponding numerals. In this embodiment of the invention a relay 310 is provided having a bimetallic leg 312 which carries a heater winding 314 and normally open contacts 316 and 318. A normally closed switch 320 is also provided, the switch being diagrammatically shown as actuated by an operating condition which is never normal when the engine is stopped, as for example, a switch which is actuated by the engine oil pressure. The switch 320 is adapted to open when the operating condition is normal, as for example, when the oil pressure reaches the proper operating value, and the switch 320 is adapted to close when the operating condition reaches a critical value.

One end of the heater winding 314 is connected to ground and the other end of the heater winding 314 is connected to the contact 232 while the contact 318 is connected to ground. One terminal of the lamp 44 is connected to the source 14 through the switch 34 and is also connected in parallel with the contact 32 of the voltage regulator 12. The other terminal of the lamp 44 is connected in parallel with the bimetallic element 312 of the relay 310 and to ground through the normally closed switch 320. As to operation, closure of the switch 34 causes the actions previously described of the regulator, leg 224 and indicator 24, all of which actions have been previously described. In addition, the initial closure of the ignition switch completes a circuit from the source 14 through the lamp 44 and the normally closed switch 320 to ground, and the lamp will light immediately, thereby enabling the vehicle operator to ascertain that the lamp is in proper working order. The lamp will continue to burn until the physical condition controlling the switch 320, which as previously mentioned, is never normal when the engine is initially started, reaches the normal operating value. For example, in the event the switch 320 is controlled by the engine oil pressure, the lamp 44 will continue to burn until the oil pressure reaches a normal operating value, at which time the lamp extinguishes, assuming that all other conditions are normal.

The initial closure of the switch 34 also completes a circuit through the heater winding 226 but since the contacts 230 and 232 are initially closed, these contacts remain closed for a short period of time due to the thermal capacity of the relay unit 220. While closed, the contacts 230 and 232 complete a circuit through the heater winding 314 and the winding starts to heat the element 312. The thermal capacities and the rates of heat application to the leg 224, however, under these conditions are such that unless the gauge circuit is in a critical condition contacts 230 and 232 open before the winding 314 heats sufficiently to close the contacts 316 and 318. Accordingly, assuming that the engine temperature is in satisfactory condition at the time the switch 34 is closed, the contacts 230 and 232 will open before the heat from the winding 314 is able to cause the contacts 316 and 318 to close. Thus, the lamp 44 will light momentarily to indicate it is in operative condition and will be extinguished when the switch 320 opens as a result of the increase in oil pressure.

The rate at which heat is supplied by the winding 314 is preferably low in relation to the rate at which heat is supplied by the winding 226 and consequently the thermal lag of the bimetallic element 312 exceeds the thermal lag of the bimetallic element 224. Under normal conditions, therefore, transient signals are not caused immediately following closure of the ignition switch or because of momentary closure of the contacts 230 and 232 which may occur during operation of the vehicle.

It will be appreciated that the delay interposed by the winding 314 may be varied by the relatively wide limits, as desired.

Assuming now that the engine temperature becomes dangerously high, it will be appreciated that the current in the gauging circuit will fall to a corresponding low value because of the positive temperature co-efficient of resistance of the element 22 so that the rate at which heat is supplied to the bimetallic element 224 is diminished. The contacts 230 and 232 will then close and such closure completes a circuit from the voltage regulator through the bimetallic element 224, contacts 230 and 232, and the winding 314 to ground. Completion of this circuit supplies heat to the bimetallic element 312 and after a brief delay, the heat from the winding 314 causes the leg 312 to warp and close the contacts 316 and 318. Closure of these last-mentioned contacts completes a circuit from the source 14 through the switch 34, lamp 44, bimetallic element 312, contacts 316 and 318 to ground, and the lamp lights, thereby indicating that an operating condition has reached a critical value. So long as the contacts 230 and 232 are closed, the contacts 316 and 318 will remain closed and the lamp will continue to burn until the operating condition is corrected.

Assuming now that the oil pressure reaches a critical value, the switch 320 closes, thereby completing a circuit from the source 14 through the switch 34, lamp 44 and the switch 320 to ground, and the lamp will light until the oil pressure is restored. From the above description, it will be appreciated that in the event both the engine temperature and the oil pressure reach critical values, the lamp will light and continue to burn until both of the operating conditions are corrected.

It will be appreciated by those skilled in the art that the heater winding 314 for the bimetallic element 312 could be in a circuit containing a normally open switch (not shown) which is closed when the gas or oil level becomes dangerously low.

It is also contemplated that the principles of the invention may be applied to gauging systems of the type disclosed in my Patent 2,625,595, granted January 13, 1953, although it is to be understood that it is not imperative in the applictaion of the principles of the present invention to the system of that patent that the variable-impedance characteristic of the several signaling relays described and claimed therein be employed.

The gauging sub-circuits and the signaling relays individual thereto represented in Fig. 8 of the drawings hereof are or may be identical to those disclosed in the aforesaid Patent 2,625,595, and consequently, their nature and operation will not be redescribed in detail, reference being had to the diclosure of that patent for a complete description of those elements and their cooperative relationship.

In general, the system of Fig. 8 is adapted to be associated with and include a source of energy represented as the conventional automobile's voltage-supply system, including a battery 410, a generator 412 and a voltage regulator current-regulator cutout assembly 414. The voltage appearing across battery 410 may be connected between conductor 416 and ground by closure of switch 418, which may be the automobile's ignition switch.

The voltage between conductor 416 and ground may be applied across each of a plurality of combined gauging and signaling circuits 420, 422 and 424. Thus, the voltage between conductor 416 and ground may be applied across the circuit comprising the polymetallic element 426 and winding 428 of the signaling relay 430, conductor 432, winding 434 of gauging device 436, winding 438 and polymetallic element 440 of the sender or current modulating device 442, and through the contacts 444 and 446 (when closed) of that device to ground. The position of contact 446, and hence, the amplitude of the average current in the traced circuit is controlled by a float 448 positioned to sense the level of liquid, in for example, the gasoline tank of an automobile.

Contact 450 of signaling relay 430 is normally closed to contact 452 so that the voltage between conductor 416 and ground is normally applied through those contacts so as to appear between conductor 276' (corresponding to conductor 276 of Fig. 5) and ground.

If the level of the fuel is not less than a preselected quantity, the amplitude of the current in the gauging and signaling circuit 420 will be adequate to cause signaling relay 430 to separate contact 450 from contact 452. If the fuel level is initially low or if it subsequently becomes low, contact 450 will remain in engagement with or become reengaged with contact 452, respectively. It will be noted that a contact 454 is or may be provided on relay 430 to engage with a contact 456 to selectively shunt the winding 428 in accordance with the principles enunciated in the aforesaid Patent 2,625,595.

Similarly, gauging and signaling circuit 422 comprises a signaling relay 460, a gauging element 462 and a current modulating device 464 adapted to measure, for example, the oil pressure in the lubricating system of an automobile, with signaling relay 460 being adapted to interconnect conductors 416 and 276' if that oil pressure becomes critically low. Gauging and signaling circuit 424 comprises a signaling relay 466, a gauging element 468 and a current modulating device 470 adapted to respond to the temperature of the coolant fluid in the automobile engine and to connect conductor 416 to conductor 276' if the temperature of that fluid reaches a preselected critical level.

Thus, just as in the case of the system represented in Fig. 5 of the drawings, the combined gauging and signaling circuits are adapted to connect a source of voltage between conductor 276' and ground, both immediately the closure of an ignition switch, such as switch 418, and in response to the attainment of any one of a plurality of preselected critical conditions. The effect of this application of voltage upon device 252' is the same as the corresponding application of voltage between conductor 276 and ground upon element 252 in Fig. 5, and consequently, that effect will not be redescribed in detail.

The only additional difference between the circuit of Fig. 8 and the circuit of Fig. 5 lies in the interposition of a device 472 in the alarm circuit to cause an interrupted or intermittent operation of the alarm lamp 44'. Flasher 472 may be of any desired type. As illustrated, it is of the hot wire type, and comprises a frame 474, between the upstanding legs of which a wire 476 is stretched. Wire 476 has a pronounced positive temperature coefficient of expansion and normally the tension thereof is such as to maintain its contact 478 separated from contact 480, in opposition to the continuously acting force of the compression spring 482. Full current flow through the wire 476, such as occurs whenever contact 264' is closed to contact 266' as well as whenever contact 262' is closed to contact 260', heats and elongates wire 476, enabling spring 482 to force contact 478 into engagement with contact 480. Closure of these contacts short circuits wire 476, allowing the latter to cool and to reopen the contacts. Flasher 472, as represented, is of a conventional type well known in the art.

Just as the representation of Fig. 8 demonstrates how the principles of the invention represented in Fig. 5 of the drawings may be modified and applied to the type of gauging and signaling system shown in my Patent 2,625,595, so also will it be apparent to those skilled in the art how the principles of the invention represented in other figures of the drawings may be similarly modified, i.e., how the principles exemplified in any other one of the figures may be applied to a gauging and signaling system of the type represented in Patent 2,625,595, as well as how a flasher may be added to the systems disclosed in Figs. 1 and 5 to 7 of the drawings.

It will be appreciated that any of the thermal elements represented in the several figures of the drawings may be designed so as to be effectively fully compensated for ambient-temperature variations or so that their output or responsiveness varies in any preselected fashion with ambient-temperature variations in the manner taught in applications Serial Nos. 108,773 and 138,249 now Patents 2,835,885 and 2,762,997 respectively.

While preferred embodiments of the invention have been shown and described, it will be understood that various changes and modifications may be made without departing from the spirit and scope of the invention.

What is claimed is:

1. A signal system for indicating the existence of a critical physical condition on a motor vehicle having electric ignition switch means which must be actuated before the engine of the vehicle can be started and for indicating the operating condition of the signal system upon initial actuation of said switch means, said system comprising a signaling element, an electric gauge circuit responsive to a said physical condition and containing an electro-responsive member for measuring said physical condition, control means responsive to the condition of said gauge circuit and effective to actuate said signaling element as a result of the attainment of a critical physical condition, and means responsive to said switch means for actuating said signaling element for a period following actuation of said switch means and for terminating actuation of said signaling element at the end of said period whether the engine of the vehicle has or has not been started.

2. A signal system for indicating the existence of a critical physical condition on a motor vehicle having electric ignition switch means which must be actuated before the engine of the vehicle can be started and for indicating the operating condition of the signal system upon initial actuation of said switch means, said system comprising an electrically operated signaling element, an electric gauge circuit responsive to a said physical condition and containing an electro-responsive member for measuring said physical condition, thermally responsive control means responsive to the condition of said gauge circuit and effective to actuate said signaling element as a result of the attainment of a critical physical condition, and means including said thermally responsive control means responsive to said switch means for actuating said signaling element for a period following actuation of said switch means and for terminating actuation of said signaling element at the end of said period whether the engine of the vehicle has or has not been started.

3. A signal system for indicating the existence of a critical physical condition on a motor vehicle having electric ignition switch means which must be actuated before the engine of the vehicle can be started and for indicating the operating condition of the signal system upon initial actuation of said switch means, said system comprising an electrically operated signaling element, a plurality of electric gauge circuits each responsive to a physical condition and each containing an electro-responsive member for measuring a said physical condition, thermally responsive control means responsive to the condition of each of said gauge circuits and effective to actuate said signaling element as the result of the attainment of a critical physical condition, and means responsive to said switch means for actuating said signaling element for a period following actuation of said switch means and for terminating actuation of said signaling element at the end of said period whether the engine of the vehicle has or has not been started.

4. A signal system for indicating the existence of a critical physical condition on a motor vehicle having electric ignition switch means which must be actuated before the engine of the vehicle can be started and for indicating the operating condition of the signal system upon initial actuation of said switch means, said condition being a condition that is not changed by stopping or starting the engine of the vehicle, said system including an electrically operated signaling element, an electric gauge circuit including means responsive to a said physical condition for measuring said physical condition, thermally responsive time delay means actuated in accordance with the condition of said gauge circuit and effective to actuate said signaling element as a result of the attainment of a critical physical condition, and means responsive to said switch means for actuating said signaling element for a period following actuation of said switch means and for terminating actuation of said signaling element at the end of said period whether the engine of the vehicle has or has not been started.

5. A signal system for indicating the existence of a critical physical condition on a motor vehicle having electric switch means that are actuable to start the engine of the vehicle and for indicating the operating condition of the signal system upon initial actuation of said switch means, said condition being a condition that is not changed by stopping or starting the engine, said system including an electrically operated signaling element, an electric gauge circuit responsive to a said physical condition for measuring said physical condition, means for supplying electric current to said element including polymetallic means cooperative with two contacts and effective to complete a circuit through said element when said polymetallic means engages either of said contacts, said polymetallic means being normally in engagement with one of said contacts, a pair of electric operators for actuating said polymetallic means, one of said operators being a delayed action operator and being energized when said switch means are actuated and also being effective to move said polymetallic means to a position spaced from both of said contacts after the signaling element has been operated and thus shown to be in operative condition, said operators being effective when both are energized to cause said polymetallic means to engage the other of said contacts, and means responsive to the condition of said gauge circuit for energizing the second operator upon the attainment of a critical physical condition.

6. A signal system for indicating the existence of a critical physical condition on a motor vehicle having electric switch means that are actuable to start the engine of the vehicle and for indicating the operating condition of the signal system upon initial actuation of said switch means, said condition being a condition that is not changed by stopping or starting the engine, said system including an electrically operated signaling element, an electric gauge circuit responsive to a said physical condition for measuring said physical condition, means for supplying electric current to said element including thermally responsive movable means cooperative with two contacts and effective to complete a circuit through said element when said movable means engages either of said contacts, said movable means being normally in engagement with one of said contacts, a pair of electric operators for actuating said movable means, one of said operators being a delayed action operator and being energized when said switch means are actuated and also being effective to move said movable means to a position spaced from both of said contacts after the signaling element has been operated and thus shown to be in operative condition, said operators being effective when both are energized to cause said movable means to engage the other of said contacts, and means responsive to the condition of said gauge circuit for energizing the second operator upon the attainment of a critical physical condition.

7. A signal system for indicating the existence of a critical physical condition on a motor vehicle having electric switch means that are actuable to start the engine of the vehicle and for indicating the operating condition of the signal system upon initial actuation of said switch means, said condition being a condition that is not changed by stopping or starting the engine, said system including an electrically operated signaling device, an electric gauge circuit responsive to a said physical condition for measuring said physical condition, means for supplying electric current to said device including a thermally responsive movable member operative between two contacts and effective to complete a circuit through said device when said member engages either of said contacts, said member being normally in engagement with one of said contacts, a pair of electrically conductive heating elements positioned in heat transfer relationship with said member, one of said elements being a delayed action element and being energized when said switch means are actuated and also being effective to move said member to a position spaced from both of said contacts after the signaling device has been operated and thus shown to be in operative condition, said elements being effective when both are energized to cause said member to engage the other of said contacts, and means responsive to the condition of said gauge circuit for energizing the second element upon the attainment of a critical physical condition.

8. A signal system for indicating the existence of a critical physical condition on a motor vehicle having electric switch means that are actuable to start the engine of the vehicle and for indicating the operating condition of the signal system upon initial actuation of said switch means, said condition being a condition that is not changed by stopping or starting the engine, said system including an electrically operated signaling device, an electric gauge circuit responsive to a said physical condition for measuring said physical condition, means for supplying electrical current to said device including a movable switch member operative between two contacts and effective to complete a circuit through said device when it engages either of said contacts, said member being normally in engagement with one of said contacts, a pair of electrically conductive heating elements for actuating said member, one of said elements being a delayed action element and being energized when said switch means are actuated and also being effective to move said member to a position spaced from both of said contacts after the signaling device has been operated and thus shown to be in operative condition, said elements being effective when both are energized to cause said member to engage the other of said contacts, and means including a thermally responsive relay actuable in response to the condition of said gauge circuit for energizing the second element upon the attainment of a critical physical condition.

9. A signal system for indicating the existence of a plurality of critical physical conditions on a motor vehicle having switch means that are actuable to start the engine of the vehicle and for indicating the operating condition of the signal system upon initial actuation of said switch means, said conditions being conditions that are not changed by stopping or starting the engine, said system including a source of electric power, an electrically operated signaling device, a plurality of gauge circuits each responsive to a said physical condition for measuring said physical conditions, means for supplying electric current to said device including a movable member connected to said source through said switch means, said member being operative between two contacts and effective to complete a circuit through said device when it engages either of said contacts, said member being normally in engagement with one of said contacts, a pair of electric operators for actuating said member, one of said operators being a delayed action operator and being energized when said switch means are actuated and also being effective to move said member to a position spaced from both said contacts after the signaling device has been operated and thus shown to be in operative condition, said operators being effective when both are energized to cause said member to engage the other of said contacts, and means responsive to the condition of each of said gauge circuits for energizing the second operator upon the attainment of a critical physical condition.

10. A signal-system for indicating the existence of a plurality of critical physical conditions on a motor vehicle having switch means that are actuable to start the engine of the vehicle and for indicating the operating condition of the signal system upon initial actuation of said switch means, said conditions being conditions that are not changed by stopping or starting the engine, said system including a source of electric power, an electrically operated signaling device, a plurality of gauge circuits each responsive to a said physical condition for measuring said physical conditions, means for supplying electrical current to said device including a thermally responsive movable member connected to said source through said switch means, said member operative between two contacts and effective to complete a circuit through said device when it engages either of said contacts, said member being normally in engagement with one of said contacts, a pair of electric operators for actuating said member, one of said operators being a delayed action operator and being energized when said switch means are actuated and also being effective to move said member to a position spaced from both of said contacts after the signaling device has been operated and thus shown to be in operative condition, said operators being effective when both are energized to cause said member to engage the other of said contacts, and means responsive to the condition of each of said gauge circuits for energizing the second operator upon the attainment of a critical physical condition.

11. A signal system for indicating the existence of a plurality of critical physical conditions on a motor vehicle having switch means that are actuable to start the engine of the vehicle and for indicating the operating condition of the signal system upon initial actuation of said switch means, said conditions being conditions that are not changed by stopping or starting the engine, said system including a source of electric power, an electrically operated signaling device, a plurality of gauge circuits each responsive to a said physical condition for measuring said physical conditions, means for supplying electrical current to said device including a thermally responsive movable member connected to said source through said switch means, said member being operative between two contacts and effective to complete a circuit through said device when it engages either of said contacts, said member being normally in engagement with one of said contacts, a pair of electrically conductive heating elements through which said current flows and positioned in heat transfer relationship with said member, one of said elements being a delayed action element and being energized when said switch means are actuated and also being effective to move said member to a position spaced from both of said contacts after the signaling device has been operated and thus shown to be in operative condition, said elements being effective when both are energized to cause said member to engage the other of said contacts, and means responsive to the condition of said gauge circuits for energizing the second element upon the attainment of a critical physical condition.

12. A signal system for indicating the existence of a plurality of critical physical conditions on a motor vehicle having switch means that are actuable to start the engine of the vehicle and for indicating the operating condition of the signal system upon initial actuation of said switch means, said conditions being conditions that are not changed by stopping or starting the engine, said system including a source of electric power, an electrically operated signaling device, a plurality of gauge circuits each responsive to a said physical condition for measuring said physical conditions, means for supplying electrical current to said device including a movable member, said member operative between two contacts connected to said source through said switch, said member effective to complete a circuit through said device when it engages either of said contacts, said member being normally in engagement with one of said contacts, a pair of electric operators for actuating said member, one of said operators being a delayed action operator and being energized when said switch means are actuated and also being effective to move said member to a position spaced from both of said contacts after the signaling device has been operated and thus shown to be in operative condition, said operators being effective when both are energized to cause said member to engage the other of said contacts, and means responsive to the condition of said gauge circuits for energizing the second operator upon the attainment of a critical physical condition.

13. A signal system for indicating the existence of a plurality of critical physical conditions on a motor vehicle having switch means that are actuable to start the engine of the vehicle and for indicating the operating condition of the signal system upon initial actuation of said switch means, said conditions being conditions that are not changed by stopping or starting the engine, said system including a source of electric power, an electrically operated signaling device, a plurality of gauge circuits each responsive to a said physical condition for measuring said physical conditions, means for supplying electrical current to said device including a thermally responsive movable member, said member operative between two contacts connected to said source through said switch means, said member effective to complete a circuit through said device when it engages either of said contacts, said member being normally in engagement with one of said contacts, a pair of electric operators for actuating said member, one of said operators being a delayed action operator and being energized when said switch means are actuated and also being effective to move said member to a position spaced from both of said contacts after the signaling device has been operated and thus shown to be in operative condition, said operators being effective when both are energized to cause said member to engage the other of said contacts, and means responsive to the condition of said gauge circuits for energizing the second operator upon the attainment of a critical physical condition.

14. A signal system for indicating the existence of a plurality of critical physical conditions on a motor vehicle having switch means that are actuable to start the engine of the vehicle and for indicating the operating condition of the signal system upon initial actuation of said switch means, said conditions being conditions that are not changed by stopping or starting the engine, said system including a source of electric power, an electrically operated signaling device, a plurality of gauge circuits each responsive to a said physical condition for measuring said physical conditions, means for supplying electrical current to said device including a thermally responsive movable member, said member operative between two contacts connected to said source through said switch means, said member effective to complete a circuit through said device when it engages either of said contacts, said member being normally in engagement with one of said contacts, a pair of electrically conductive heating elements through which said current flows and positioned in heat transfer relationship with said member, one of said elements being a delayed action element and being energized when said switch means are actuated and also being effective to move said member to a position spaced from both of said contacts after the signaling device has been operated and thus shown to be in operative condition, said elements being effective when both are energized to cause said member to engage the other of said contacts, and means responsive to the condition of said gauge circuits for energizing the second element upon the attainment of a critical physical condition.

15. A signal system for indicating the existence of a critical physical condition on a motor vehicle having electric ignition switch means which must be actuated before the engine of the vehicle can be started and for indicating the operating condition of the signal system upon initial actuation of said switch means, said condition being a condition that is not changed by stopping or starting the engine, said system including an electrically operated signaling element, an electric gauge circuit responsive to a said physical condition for measuring said physical condition, means for supplying electrical current to said element including a pair of relays each having a movable switch element, one of said relays having a pair of normally closed contacts one of which is carried by the movable element, the other of said relays having a pair of normally open contacts one of which is carried by the movable switch element, each of said relays being effective to complete a circuit through said device when the contacts are engaged, each of said relays also having an electric operator for actuating the movable element, the operator of said one relay being a delayed action operator and being responsive to said switch means and energized when said switch means are actuated and whether the engine of the vehicle has or has not been started and being effective to open said normally closed contacts after the signaling element has been operated for a period following actuation of said switch means and thus shown to be in operative condition, the operator of said other relay being effective to close said normally open contacts, and means responsive to the condition of said gauge circuit for energizing the operator of said other relay upon the attainment of a critical physical condition.

16. A signal system for indicating the existence of a plurality of critical physical conditions on a motor vehicle having switch means which must be actuated before the engine of the vehicle can be started and for indicating the operating condition of the signal system upon initial actuation of said switch means, said conditions being conditions that are not changed by stopping or starting the engine, said system including a source of electric power, an electrically operated signaling device, a plurality of gauge circuits each responsive to a said physical condition for measuring said physical conditions, means for supplying electrical current to said element including a pair of relays each having a movable switch element, one of said relays having a pair of normally closed contacts one of which is carried by the movable element, the other of said relays having a pair of normally open contacts one of which is carried by the movable switch element, each of said relays being effective to complete a circuit through said device when the contacts are engaged, each of said relays also having an electric operator for actuating the movable element, the operator of said one relay being a delayed action operator and being responsive to said switch means and energized when said switch means are actuated and whether the engine of the vehicle has or has not been started and being effective to open said normally closed contacts after the signaling element has been operated for a period following actuation of said switch means and thus shown to be in operative condition, the operator of said other relay being effective to close said normally open contacts, and means responsive to the condition of each of said gauge circuits for energizing the operator of said other relay upon the attainment of a critical physical condition.

17. A signal system for indicating the existence of a critical physical condition on a motor vehicle having electric ignition switch means which must be actuated before the engine of the vehicle can be started and for indicating the operating condition of the signal system upon initial actuation of said switch means, said condition being a condition that is not changed by stopping or starting the engine, said system including an electrically operated signaling element, an electric gauge circuit responsive to a said physical condition for measuring said physical condition, means for supplying electrical current to said element including a pair of thermally responsive relays each having a movable switch element, one of said relays having a pair of normally closed contacts one of which is carried by said movable element, the other of said relays having a pair of normally open contacts one of which is carried by the movable switch element, each of said relays being effective to complete a circuit through said device when the contacts are engaged, each of said relays also having an electric operator for actuating the movable element, the operator of said one relay being a delayed action operator and being responsive to said switch means and energized when said switch means are actuated and whether the engine of the vehicle has or has not been started and being effective to open said normally closed contacts after the signaling element has been operated for a period following actuation of said switch means and thus shown to be in operative condition, the operator of said other relay being effective to close said normally open contacts, and means responsive to the condition of said gauge circuit for energizing the operator of said other relay upon the attainment of a critical physical condition.

18. A signal system for indicating the existence of a plurality of critical physical conditions on a motor vehicle having switch means which must be actuated before the engine of the vehicle can be started and for indicating the operating condition of the signal system upon initial actuation of said switch means, said conditions being conditions that are not changed by stopping or starting the engine, said system including a source of electric power, an electrically operated signaling element, a plurality of gauge circuits each responsive to a said physical condition for measuring said physical conditions, means for supplying electrical current to said device including a pair of thermally responsive relays each having a movable switch element, one of said relays having a pair of normally closed contacts one of which is carried by said movable element, the other of said relays having a pair of normally open contacts one of which is carried by the movable switch element, each of said relays being effective to complete a circuit through said device when the contacts are engaged, each of said relays also having an electric operator for actuating the movable element, the operator of said one relay being a delayed action operator and being responsive to said switch means and energized when said switch means are actuated and whether the engine of the vehicle has or has not been started and being effective to open said normally closed contacts after the signaling element has been operated for a period following actuation of said switch means and thus shown to be in operative condition, the operator of said other relay being effective to close said normally open contacts, and means including a plurality of thermally responsive relays in said gauge circuits each actuable in response to the existence of a critical physical condition and each effective to energize the operator of said other relay upon the attainment of a critical physical condition.

19. A signaling system for a motor vehicle having an engine starting switch which must be actuated before the engine of the vehicle can be started, said system including an electrically operated signaling device, an electric circuit for energizing said device and thus effecting a signal, a normally closed switch, condition responsive means operable in response to a physical condition which is never normal when the engine is stopped for opening said normally closed switch only when the condition is normal, a normally open switch in said circuit, delayed action electric means for closing said second switch, said delay means being connected in a signal control circuit, an electric gauge circuit responsive to another physical condition which is not affected by stopping and starting the engine and containing an electro-responsive member for measuring said other physical condition, mechanism responsive to the condition of said gauge circuit for energizing the signal control circuit only when said second condition is abnormal, said switches, being connected in parallel circuits and in series with said signaling device, means for connecting said circuits to a source of electric power when the starting switch is closed, and means responsive to said switch means for actuating said signaling device for a period following actuation of said starting switch and for terminating actuation of said signaling device at the end of said period whether the engine of the vehicle has or has not been started.

20. A signaling system for a motor vehicle having an engine starting switch which must be actuated before the engine of the vehicle can be started, said system including an electrically operated signaling device, an electric circuit for energizing said device and thus effecting a signal, a normally closed switch, condition responsive means operable in response to a physical condition which is never normal when the engine is stopped for opening said normally closed switch only when the condition is normal, a normally open switch in said circuit, thermally responsive delayed action electric means for closing said second switch, said means being connected in a signal control circuit, an electric gauge circuit responsive to another physical condition which is not affected by stopping and starting the engine and containing an electro-responsive member for measuring said other physical condition, mechanism responsive to the condition of said gauge circuit for energizing the signal control circuit only when said second condition is abnormal, said switches being connected in parallel circuits and in series with said signaling device, means for connecting said circuits to a source of electric power when the starting switch is closed, and means responsive to said switch means for actuating said signaling device for a period following actuation of said starting switch and for terminating actuation of said signaling device at the end of said period whether the engine of the vehicle has or has not been started.

21. A signaling system for a motor vehicle having an engine starting switch which must be actuated before the engine of the vehicle can be started, said system including an electrically operated signaling device, an electric circuit for energizing said device and thus effecting a signal, a normally closed switch, condition responsive means operable in response to a plurality of physical conditions which are never normal when the engine is stopped for opening said normally closed switch only when the conditions are normal, a normally open switch in said circuit, delayed action electric means for closing said second switch, said means being connected in a signal control circuit, an electric gauge circuit responsive to another physical condition which is not affected by stopping and starting the engine and containing an electro-responsive member for measuring said other physical condition, mechanism responsive to the condition of said gauge circuit for energizing the signal control circuit only when said second condition is abnormal, said switches being connected in parallel circuits and in series with said signaling device, means for connecting said circuits to a source of electric power when the starting switch is closed, and means responsive to said switch means for actuating said signaling device for a period following actuation of said starting switch and for terminating actuation of said signaling device at the end of said period whether the engine of the vehicle has or has not been started.

22. A signaling system for a motor vehicle having an engine starting switch which must be actuated before the engine of the vehicle can be started, said system including an electrically operated signaling device, an electric circuit for energizing said device and thus effecting a signal, a normally closed switch, condition responsive means operable in response to a physical condition which is never normal when the engine is stopped for opening said normally closed switch only when the condition is normal, a normally open switch in said circuit, delayed action electric means for closing said second switch, said means being connected in a signal control circuit, an electric gauge circuit responsive to a plurality of physical conditions which are not affected by stopping and starting the engine and containing an electro-responsive member for measuring said other physical condition, mechanism responsive to the condition of said gauge circuit for energizing the signal control circuit when any one of said second conditions is abnormal, said switches being connected in parallel circuits and in series with said signaling device, means for connecting said circuits to a source of electric power when the starting switch is closed, and means responsive to said switch means for actuating said signaling device for a period following actuation of said starting switch and for terminating actuation of said signaling device at the end of said period whether the engine of the vehicle has or has not been started.

23. In a signaling system for automobiles having a selectively actuatable ignition switch which must be actuated before the engine of the vehicle can be started, a source of energy and condition-responsive current modulating means connected in circuit with one another, sensing means for sensing the average energy in said circuit over finite periods of time, an alarm device, separate delay means controlled by said sensing means for operating said alarm device, and means including said delay means for operating said alarm device for a preselected period following actuation of said switch and for deenergizing said device at the end of said period whether the engine of the vehicle has or has not been started.

24. In a signaling system for automobiles having a selectively actuatable ignition switch which must be actuated before the engine of the vehicle can be started, a source of energy and condition-responsive current modulating means connected in circuit with one another, sensing means for sensing the average energy in said circuit over finite periods of time, an alarm device, thermally-responsive relay means having two windings, means including said sensing means and one of said windings for causing said thermally-responsive relay means to operate said alarm device, and means including the other of said windings for causing said thermally-responsive relay means to operate said alarm device for a preselected period following actuation of said switch and for deenergizing said device at the end of said period whether the engine of the vehicle has or has not been started.

References Cited in the file of this patent

UNITED STATES PATENTS

| | | |
|---|---|---|
| 2,338,474 | Wilson | Jan. 4, 1944 |
| 2,511,631 | Gordon | June 13, 1950 |
| 2,571,360 | Hallerberg | Oct. 16, 1951 |
| 2,605,339 | Connolly | July 29, 1952 |
| 2,762,997 | Boddy | Sept. 11, 1956 |
| 2,782,401 | Boddy | Feb. 19, 1957 |